(12) United States Patent
Jantzi et al.

(10) Patent No.: US 12,558,954 B1
(45) Date of Patent: Feb. 24, 2026

(54) COMMERCIAL ELECTRIC VEHICLE DRIVE UNIT

(71) Applicant: Harbinger Motors Inc., Garden Grove, CA (US)

(72) Inventors: Samuel Jantzi, Redondo Beach, CA (US); Jackson George Diebel, Hermosa Beach, CA (US); Alex Tylee, Huntington Beach, CA (US); Phillip John Weicker, Redondo Beach, CA (US)

(73) Assignee: Harbinger Motors Inc., Garden Grove, CA (US)

( * ) Notice: Subject to any disclaimer, the term of this patent is extended or adjusted under 35 U.S.C. 154(b) by 0 days.

(21) Appl. No.: 19/212,108

(22) Filed: May 19, 2025

(51) Int. Cl.
| | |
|---|---|
| *B60K 17/04* | (2006.01) |
| *B60K 7/00* | (2006.01) |
| *F16H 57/04* | (2010.01) |
| *F16H 57/02* | (2012.01) |

(52) U.S. Cl.
CPC .......... *B60K 17/046* (2013.01); *B60K 7/0007* (2013.01); *F16H 57/0436* (2013.01); *F16H 57/0471* (2013.01); *B60K 2007/0076* (2013.01); *F16H 2057/0206* (2013.01)

(58) Field of Classification Search
CPC ............... B60K 17/046; B60K 7/0007; B60K 2007/0076; F16H 57/0471; F16H 57/0436
USPC ......................................................... 180/5.6
See application file for complete search history.

(56) References Cited

U.S. PATENT DOCUMENTS

| | | | |
|---|---|---|---|
| 1,142,177 | A | 6/1915 | Kennedy |
| 9,126,581 | B2 | 9/2015 | Swales et al. |
| 9,707,956 | B2 | 7/2017 | Swales et al. |
| 9,840,141 | B2 | 12/2017 | Ooki et al. |
| 10,270,314 | B2 | 4/2019 | Matsuda |
| 10,439,477 | B2 | 10/2019 | Pinkley et al. |
| 10,511,210 | B2 | 12/2019 | Yu |
| 10,538,238 | B2 | 1/2020 | Swales et al. |
| 10,746,282 | B2 | 8/2020 | Ito et al. |
| 10,780,849 | B1 | 9/2020 | Garcia et al. |

(Continued)

FOREIGN PATENT DOCUMENTS

| | | |
|---|---|---|
| CN | 115720022 A | 2/2023 |
| CN | 115720027 A | 2/2023 |

(Continued)

OTHER PUBLICATIONS

U.S. Appl. No. 18/463,822, Non Final Office Action mailed Nov. 14, 2023, 14 pgs.

(Continued)

*Primary Examiner* — Hau V Phan
(74) *Attorney, Agent, or Firm* — Polygon IP, LLP

(57) ABSTRACT

A commercial electric drive unit includes an electric motor module and a planetary gearbox module. The electric motor module and the planetary gearbox module are disposed longitudinally in line with each other. The electric motor module and the planetary gearbox module are configured to share one or more lubrication and cooling fluids and a single pump may provide such fluid to both modules. Torque generated by the electric motor is output to the planetary gearbox for multiplication. The planetary gearbox is configured to couple to a prop shaft for output of torque that has been multiplied by the planetary gearbox.

20 Claims, 14 Drawing Sheets

(56) References Cited

U.S. PATENT DOCUMENTS

| | | | |
|---|---|---|---|
| 10,865,873 B2 | 12/2020 | Ishikawa et al. | |
| 11,161,403 B2 * | 11/2021 | Lo | B60L 50/15 |
| 11,323,006 B1 | 5/2022 | Mason et al. | |
| 11,333,238 B2 | 5/2022 | Ishikawa et al. | |
| 11,578,798 B2 | 2/2023 | Nakata et al. | |
| 11,732,795 B2 | 8/2023 | Ishikawa et al. | |
| 11,773,962 B1 | 10/2023 | Vanderlip et al. | |
| 11,984,794 B2 * | 5/2024 | LaForce | F16H 57/0457 |
| 12,018,746 B2 | 6/2024 | Diebel et al. | |
| 12,078,238 B2 * | 9/2024 | Nakawatari | F16H 57/0471 |
| 12,188,549 B2 * | 1/2025 | Kosaka | H02K 7/006 |
| 12,276,334 B2 * | 4/2025 | Kosaka | F16H 57/0454 |
| 2011/0114399 A1 | 5/2011 | Palfai et al. | |
| 2014/0335995 A1 * | 11/2014 | Swales | F16H 57/0483 |
| | | | 477/3 |
| 2015/0222162 A1 | 8/2015 | Pinkley et al. | |
| 2015/0336573 A1 | 11/2015 | Swales et al. | |
| 2015/0337948 A1 | 11/2015 | Leitgeb et al. | |
| 2017/0282909 A1 | 10/2017 | Swales et al. | |
| 2020/0240314 A1 | 7/2020 | Goto et al. | |
| 2021/0175779 A1 | 6/2021 | Kim | |
| 2022/0042599 A1 | 2/2022 | Diebel et al. | |
| 2022/0049768 A1 | 2/2022 | Nakamatsu et al. | |
| 2022/0090673 A1 | 3/2022 | Tamai et al. | |
| 2022/0185122 A1 | 6/2022 | Fukunaga | |
| 2022/0194230 A1 | 6/2022 | Fukunaga | |
| 2022/0196135 A1 | 6/2022 | Tamura et al. | |
| 2022/0281310 A1 | 9/2022 | Nakata et al. | |
| 2022/0282783 A1 | 9/2022 | Nakata et al. | |
| 2022/0286011 A1 | 9/2022 | Nakata et al. | |
| 2022/0321050 A1 | 10/2022 | Jono | |
| 2022/0371421 A1 | 11/2022 | Tanizawa | |
| 2022/0376588 A1 | 11/2022 | Nakamura et al. | |
| 2023/0006501 A1 | 1/2023 | Mason et al. | |
| 2023/0067898 A1 | 3/2023 | Oki et al. | |
| 2023/0341043 A1 | 10/2023 | Garmel et al. | |
| 2024/0093777 A1 | 3/2024 | Diebel et al. | |
| 2024/0247713 A1 * | 7/2024 | Kosaka | H02K 7/116 |
| 2024/0353000 A1 | 10/2024 | Diebel et al. | |

FOREIGN PATENT DOCUMENTS

| | | |
|---|---|---|
| DE | 102019117494 A1 | 12/2020 |
| JP | 2017155888 A | 9/2017 |
| JP | 6215613 B2 | 10/2017 |
| KR | 101755028 B1 | 7/2017 |
| WO | 8706668 A1 | 11/1987 |
| WO | 2019178848 A1 | 9/2019 |
| WO | 2023279070 | 1/2023 |
| WO | 2024054986 A1 | 3/2024 |

OTHER PUBLICATIONS

U.S. Appl. No. 18/463,822, Notice of Allowance mailed Feb. 26, 2024, 8 pgs.

International Application Serial No. PCT/US23/73752, Search Report and Written Opinion mailed Dec. 29, 2023, 10 pgs.

International Application Serial No. PCT/US23/73752, International Preliminary Report on Patentability mailed Mar. 20, 2025, 6 pgs.

Machine translation of WO 87/06668 A1 obtained on Nov. 7, 2023.

* cited by examiner

COMMERCIAL ELECTRIC VEHICLE DRIVE UNIT

BACKGROUND

Electric motors are used in electric vehicles and other applications to produce mechanical energy from electrical energy. The mechanical energy provides motive torque to the electric vehicle. The electric motors may transmit the mechanical energy via drivetrain components. The electric motor and drivetrain components generate heat during operation. Cooling of the electric motor and drivetrain components is, thus, needed in order to safely and reliably operate the vehicle.

SUMMARY

Described herein are commercial electric vehicle drive units. The commercial electric vehicle drive units may include an electric motor and a planetary gearbox configured to multiply the torque generated by the electric motor. The electric motor and the planetary gearbox may share cooling and/or lubrication fluids. The planetary gearbox may be disposed longitudinally in line with the electric motor and may include a form factor that is not larger than that of the electric motor's in at least one dimension.

These and other embodiments are described further below with reference to the Figures.

Clauses

Clause 1. A commercial electric drive unit 300 comprising: a drive unit housing 358, comprising: a first housing portion 468, comprising a divider wall 560 and containing a first cavity 522; and a second housing portion 470, mechanically connected to the first housing portion 468, disposed longitudinally in line with the first housing portion 468, and at least partially containing a second cavity 524, wherein the divider wall 560 separates the first cavity 522 and the second cavity 524; an electric motor 532, disposed within the first cavity 522 and comprising: a stator 534; and a rotor 536; a motor output shaft 538, coupled to the rotor 536 and configured to transmit torque generated by the electric motor 532; a planetary gearset 540, disposed longitudinally in line of the electric motor 532 within the drive unit housing 358 and configured to provide multiplication of the torque generated by the electric motor 532, the planetary gearset 540 comprising: a sun gear 848, connected to the motor output shaft 538 to receive the torque generated by the electric motor 532; a plurality of planet gears 852 disposed around the sun gear 848; and a ring gear 854 disposed around the plurality of planet gears 852; and a gearset output shaft 326, coupled to the planetary gearset 540 and configured to output the torque multiplied by the planetary gearset 540.

Clause 2. The commercial electric drive unit 300 of clause 1, wherein the first cavity 522 and the second cavity 524 are fluidically connected and wherein the electric motor 532 and the planetary gearset 540 are configured to share a fluid.

Clause 3. The commercial electric drive unit 300 of clause 2, wherein the divider wall 560 comprises an opening 978 that defines at least a portion of a lower sump 979 to fluidically connect the first cavity 522 and the second cavity 524.

Clause 4. The commercial electric drive unit 300 of clause 3, wherein the first housing portion 468 further comprises an upper sump 872 disposed on a top portion of the first housing portion 468 above the first cavity 524, and wherein the commercial electric drive unit 300 further comprises: a fluid pump 976 configured to pump the fluid from the lower sump 979 to the upper sump 872.

Clause 5. The commercial electric drive unit 300 of clause 4, wherein: the first housing portion 468 further comprises a first planetary fluid channel 986-1, wherein the upper sump 872 is fluidically connected to the first planetary fluid channel 986-1 to allow the fluid to flow from the upper sump 872 into the first planetary fluid channel 986-1; and the second housing portion 470 further comprises a second planetary fluid channel 986-2 configured to provide the fluid to the second cavity 524, wherein the first planetary fluid channel 986-1 is fluidically connected to the second planetary fluid channel 986-2 to allow the fluid to flow from the first planetary fluid channel 986-1 into the second planetary fluid channel 986-2.

Clause 6. The commercial electric drive unit 300 of clause 5, wherein planetary gearset 540 further comprises a planet carrier bearing 983, and wherein the second planetary fluid channel 986-2 is configured to distribute the fluid to the planet carrier bearing 983.

Clause 7. The commercial electric drive unit 300 of clause 6, further comprising: a fluid collector 1356, coupled to the second housing portion 470 at a lower portion of the ring gear 854.

Clause 8. The commercial electric drive unit 300 of clause 6, further comprising: a bearing carrier 1396, disposed between the planetary gearset 540 and the planet carrier bearing 983 and configured to retain the planet carrier bearing 983.

Clause 9. The commercial electric drive unit 300 of clause 8, wherein the bearing carrier 1396 is coupled to the second housing portion 470 by a plurality of carrier bolts 1398.

Clause 10. The commercial electric drive unit 300 of clause 5, wherein the upper sump 872 comprises: a first reservoir 872-1 comprising one or more first fluid exits 984-2 configured to distribute fluid to one or more of the stator 534 or the rotor 536; and a second reservoir 872-3 comprising one or more second fluid exits 984-3 configured to distribute the fluid to one or more of the stator 534 or the rotor 536.

Clause 11. The commercial electric drive unit 300 of clause 10, wherein the upper sump 872 further comprises a cross reservoir 872-2, wherein the first reservoir 872-1 and the second reservoir 872-3 are fluidically connected by the cross reservoir 872-2.

Clause 12. The commercial electric drive unit 300 of clause 11, wherein the cross reservoir 872-2 is rectangular in profile.

Clause 13. The commercial electric drive unit 300 of clause 10, wherein: the electric motor 532 further comprises a motor bearing 981; and the first housing portion 468 further comprises a side fluid exit 984-1 configured to distribute the fluid to the motor bearing 981, wherein the second reservoir 872-3 is fluidically connected to the side fluid exit 984-1 to allow the fluid to flow from the second reservoir 872-3 into the side fluid exit 984-1.

Clause 14. The commercial electric drive unit 300 of clause 1, further comprising a park lock 542, the park lock 542 comprising a park gear 744 coupled to the motor output shaft 538.

Clause 15. The commercial electric drive unit 300 of clause 14, wherein the park gear 744 is welded to the motor output shaft 538.

Clause 16. The commercial electric drive unit 300 of clause 1, wherein a first outer diameter 562 of the stator 534 is greater than a second outer diameter 564 of the ring gear 854.

Clause 17. The commercial electric drive unit 300 of clause 1, wherein the first housing portion 468 and the second housing portion 470 are mechanically connected by a plurality of housing bolts 430.

Clause 18. The commercial electric drive unit 300 of clause 1, wherein the gearset output shaft 326 is disposed longitudinally in line of the planetary gearset 540 and is at least partially disposed outside the drive unit housing 538.

Clause 19. A commercial electric vehicle 100 comprising the commercial electric drive unit 300 of clause 1, wherein the commercial electric vehicle 100 further comprises: a ladder frame 102, coupled to the commercial electric drive unit 300 and comprising: a first frame rail 228A; and a second frame rail 228B; and a prop shaft 220, coupled to the gearset output shaft 326.

Clause 20. The commercial electric vehicle 100 of clause 19, wherein the commercial electric drive unit 300 is disposed between the first frame rail 228A and the second frame rail 228B and is disposed to not protrude below the first frame rail 228A and/or the second frame rail 228B.

DETAILED DESCRIPTION

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

It is appreciated that, for the purposes of this disclosure, when an element includes a plurality of similar elements distinguished by a letter or a dashed number following the ordinal indicator (e.g., 872-1, 872-2, and 872-3 or 1398A and 1398B) and reference is made to only the ordinal indicator itself (e.g., 872 or 1398), such a reference is applicable to all the similar elements.

As described herein, "coupled to" may refer to an element that is directly or indirectly connected to another element. Such elements may be coupled via any appropriate permanent (e.g., unremovable without destruction), semi-permanent (e.g., removable through removal of other components), and/or temporary (e.g., directly removable) technique. Elements that are coupled together may be coupled in a fixed or movable relationship.

The vehicle and components described herein may be referred to in a standardized coordinate system. That is, positioning of the components of the vehicle may be defined as longitudinally along the X axis shown in the figures, laterally along the Y axis shown in the figures, and height wise along the Z axis shown in the figures.

INTRODUCTION

Electric motors may be retrofitted in place of internal combustion engines (ICE). Electric motors may generate high amounts of torque. The amount of torque that an electric motor is able to generate is often in relationship to its exterior dimensions. Though electric motors are generally more compact than ICE that can generate the equivalent torque amount, the form factor between electric motor and ICE are different. ICE typically have their output shaft near the bottom of the motor while electric motors have an output shaft in the middle of the motor. Accordingly, even though electric motors may be dimensionally more compact, the difference in form factor makes retrofitting an electric motor in a location that previously held an ICE difficult, as, if the electric motor output shaft is located in the same location as that of the ICE, the bottom of an electric motor would often hang much lower than the bottom of ICE. The lower bottom location of the electric motor compared to ICE may lead to clearance issues.

Figure 1:
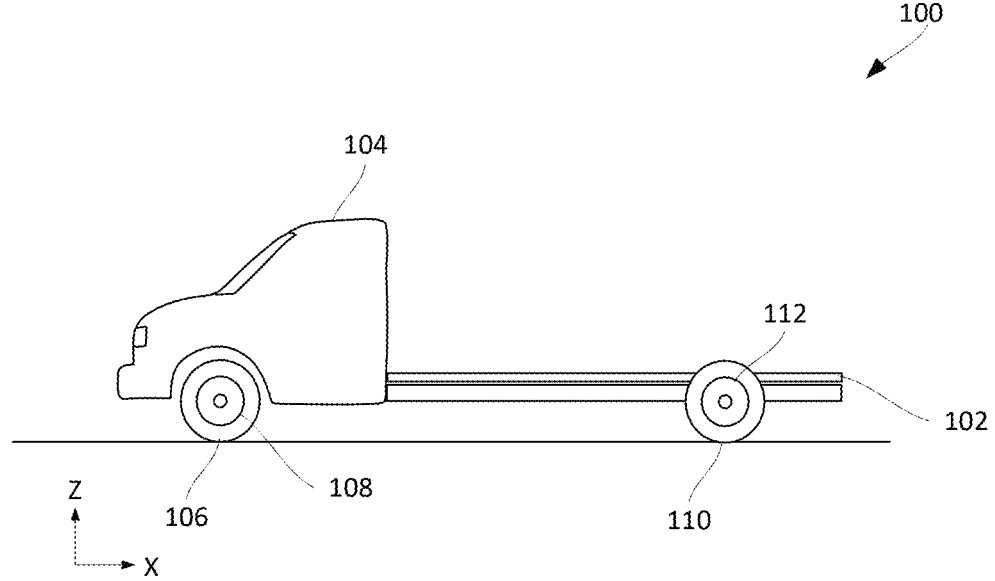
FIG. 1 illustrates a vehicle, in accordance with certain embodiments.

Described herein are commercial electric vehicle drive units that include a planetary gearbox gear reduction. The planetary gearbox allows for a smaller electric motor, providing packaging advantages, especially in situations where the electric drive unit is retrofitted in place of an ICE. The planetary gearbox may receive torque input from the electric motor and output multiplied torque to a prop shaft. The prop shaft may then be coupled to a rear differential to provide motive force for the commercial electric vehicle.
Vehicle Examples FIG. 1 illustrates a vehicle, in accordance with certain embodiments. FIG. 1 illustrates vehicle 100 that includes chassis 102, cab 104, front tire 106, front wheel 108, rear tire 110, and rear wheel 112. In certain embodiments, vehicle 100 may be a commercial vehicle with electric propulsion. Vehicle 100 may represent any type of commercial vehicle, such as a vehicle with an integrated cargo volume, (e.g., a delivery van or a box truck), a flatbed truck, a pickup truck, a truck with an enclosed cargo box, a towing vehicle, and/or any other such commercial vehicle. Chassis 102 may be any type of appropriate chassis, such as a ladder frame, unibody, monocoque, semi-monocoque, and/or other such type of chassis that may allow for vehicle 100 to provide load-carrying and/or towing ability. Though not illustrated in FIG. 1, vehicle 100 may additionally include one or more of a flatbed, truck bed, cargo container, cabin, and/or other compartment for carrying loads and/or performing tasks. In certain embodiments, vehicle 100 may be powered by one or more electric drive units (e.g., electric motors) that are mounted in various portions of vehicle 100. For example, vehicle 100 may mount one or more electric motors in front of tire 110 and wheel 112, within the frame rails of 102, and/or within another portion of vehicle 100.

Figure 2:
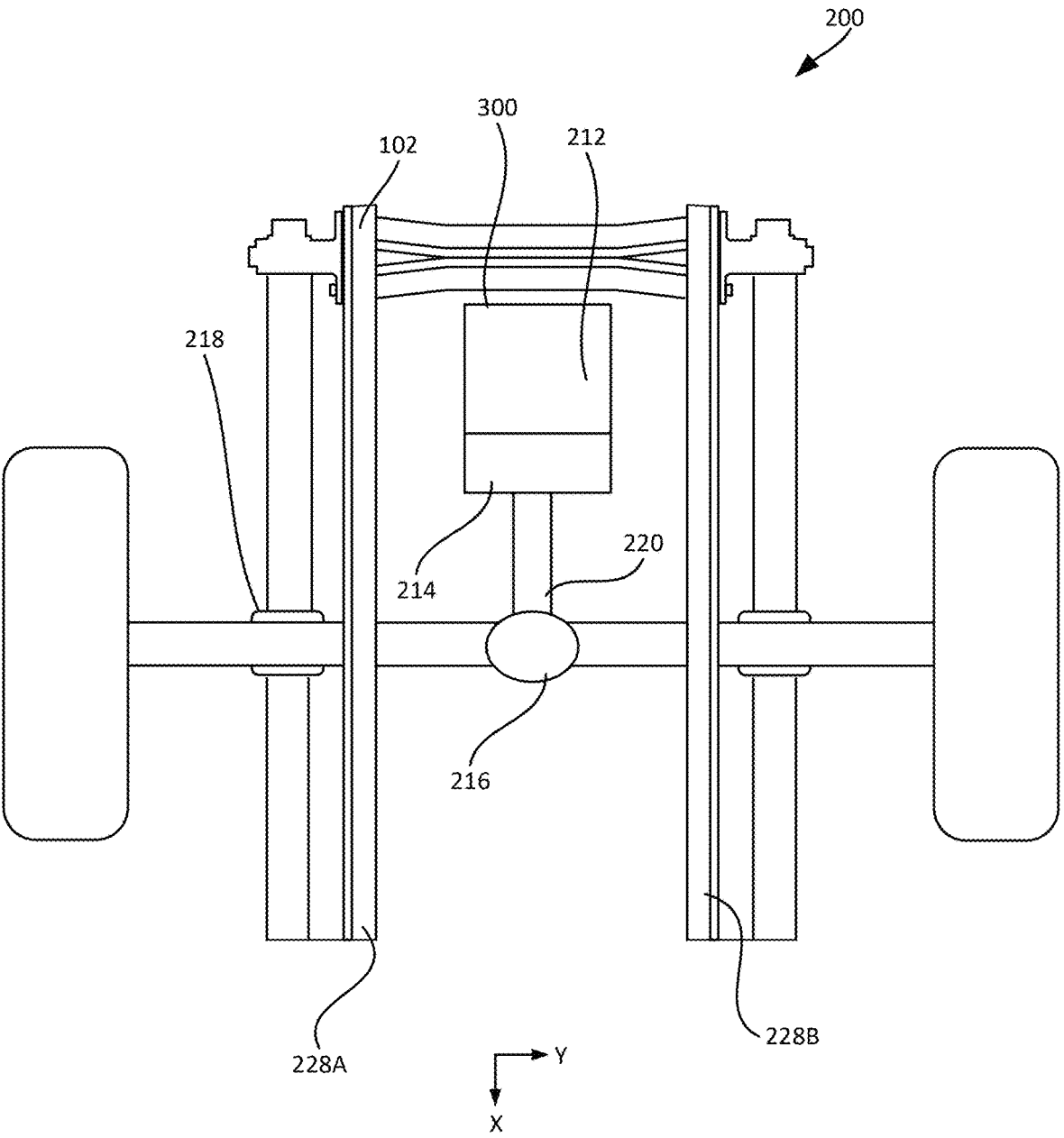
FIG. 2 is a top view of an electric commercial vehicle architecture, in accordance with certain embodiments.

FIG. 2 is a top view of an electric commercial vehicle architecture, in accordance with certain embodiments. FIG. 2 illustrates vehicle architecture 200, which includes chassis 102, commercial electric drive unit 300, prop shaft 220, differential 216, and suspension 218.

Variously, chassis 102 may include first frame rail 228A and second frame rail 228B, which may be disposed on opposing sides (e.g., the left and right sides) of chassis 102. Commercial electric drive unit 300 may include electric motor module 212 and planetary gearbox module 214. Commercial electric drive unit 300 may be disposed between first frame rail 228A and second frame rail 228B. In certain embodiments, commercial electric drive unit 300 may be configured to be disposed between first frame rail 228A and second frame rail 228B in a manner where commercial electric drive unit 300 does not protrude or only minimally protrudes below the bottom of first frame rail 228A and second frame rail 228B due to the compact size provided by pairing of a compact electric motor module 212 with planetary gearbox module 214.

Power outputted by planetary gearbox module 214 of commercial electric drive unit 300 may be provided to prop shaft 220. Prop shaft 220 may be coupled to differential 216, which may apportion motive force to one or both of the wheels via a plurality of driveshafts (e.g., which may or may not be disposed within an axle). Differential 216, the wheels, the driveshafts, and/or any axles may be suspended by suspension 218.

Drive Unit Examples

Figure 3:
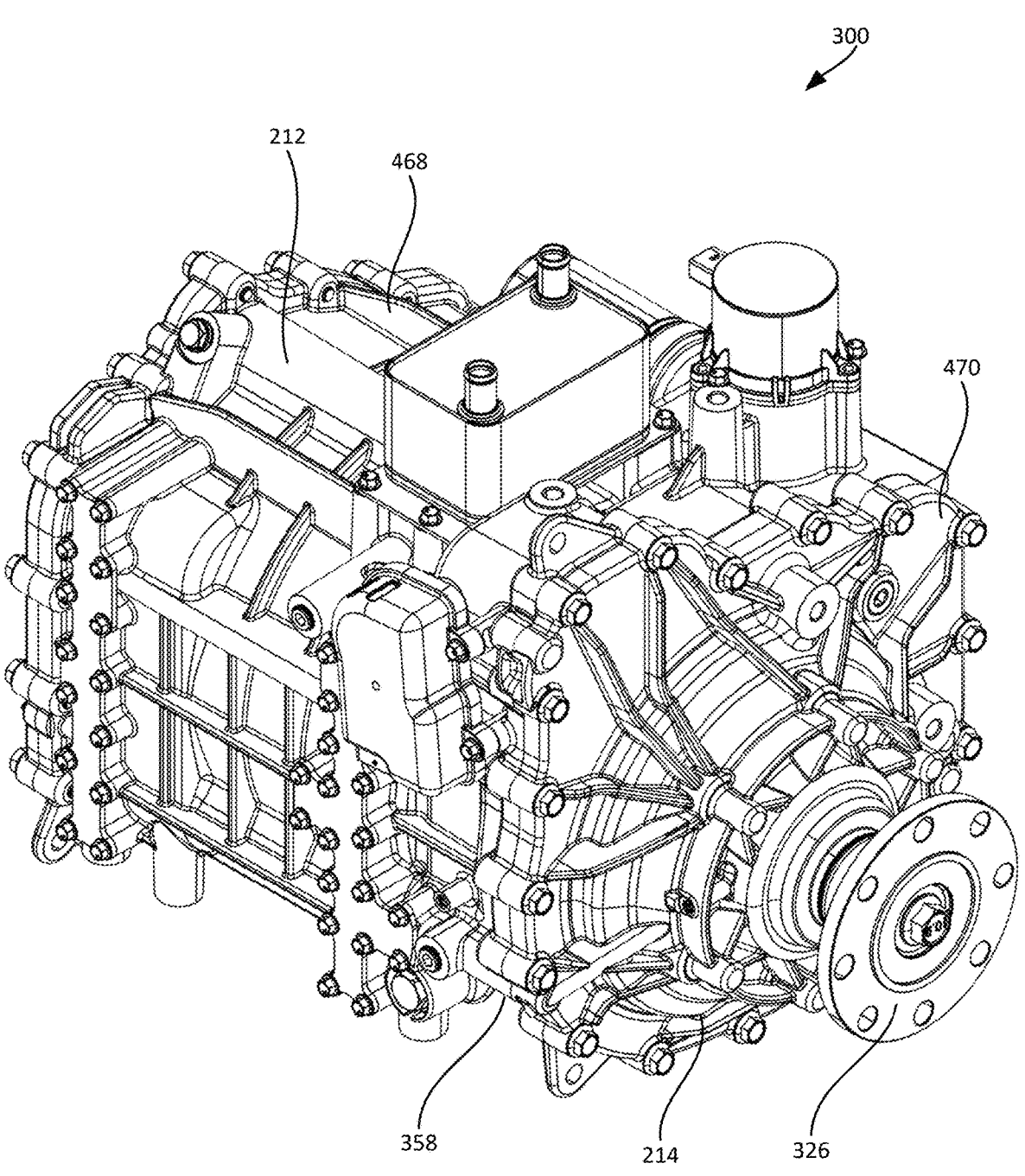
FIG. 3 illustrates an isometric view of a commercial electric vehicle drive unit, in accordance with certain embodiments.

FIG. 3 illustrates an isometric view of a commercial electric vehicle drive unit, in accordance with certain embodiments. FIG. 3 illustrates commercial electric drive unit 300 that includes electric motor module 212 and planetary gearbox module 214. Drive unit housing 358 contains the various internal components of commercial electric drive unit 300.

Drive unit housing 358 may be composed of first housing portion 468 and second housing portion 470. In various embodiments, electric motor module 212 may include first housing portion 468 and planetary gearbox module 214 may include second housing portion 470. Electric motor module 212 may generate and transfer torque to planetary gearbox module 214. Planetary gearbox module 214 may multiply the torque via a planetary gearset and output the multiplied torque via gearset output shaft 326. Gearset output shaft 326 may be configured to couple to prop shaft 220 and provide motive force to vehicle 100 via the techniques described herein. In certain embodiments, electric motor module 212 and planetary gearbox module 214 may be coupled together via any mechanical technique, as described herein.

Figure 4:
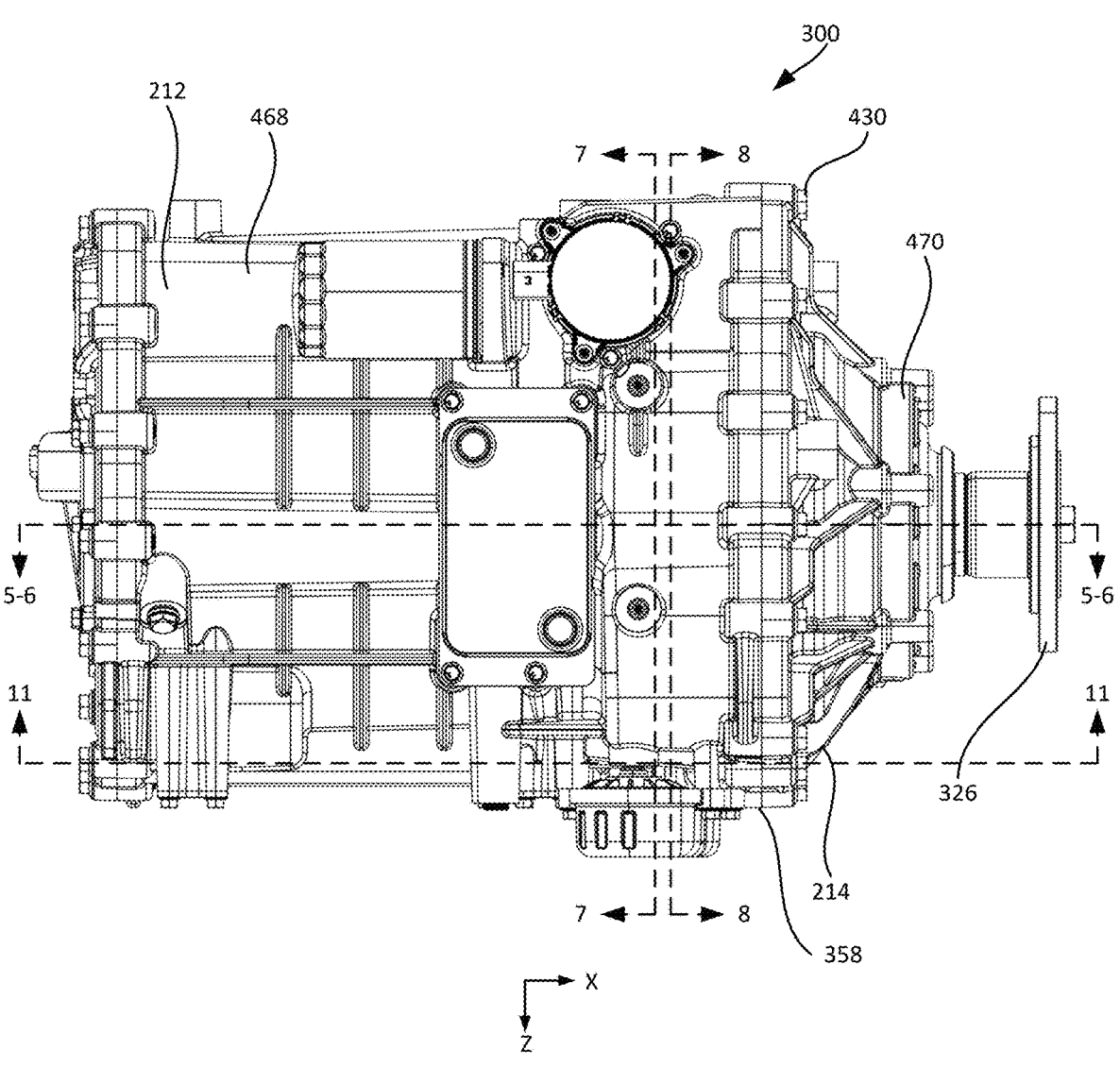
FIG. 4 illustrates a side view of the commercial electric vehicle drive unit, in accordance with certain embodiments.

FIG. 4 illustrates a side view of the commercial electric vehicle drive unit, in accordance with certain embodiments. FIG. 4 further illustrates commercial electric drive unit 300. FIG. 4 illustrates a plurality of different planes, which indicates the planes utilized for cutaway views of FIGS. 5, 6, 7, 8, and 11, per the labels of the planes in FIG. 4.

As shown in FIG. 4, commercial electric drive unit 300 may include electric motor module 212 and planetary gearbox module 214, both disposed within drive unit housing 358. Commercial electric drive unit 300 may output torque via gearset output shaft 326, which may be configured to be coupled to prop shaft 220.

Drive unit housing 358 may include first housing portion 468 and second housing portion 470. First housing portion 468 and second housing portion 470 may be coupled together with one or a plurality of housing bolts 430. Accordingly, first housing portion 468 and second housing portion 470 may be mechanically coupled.

Figure 5:
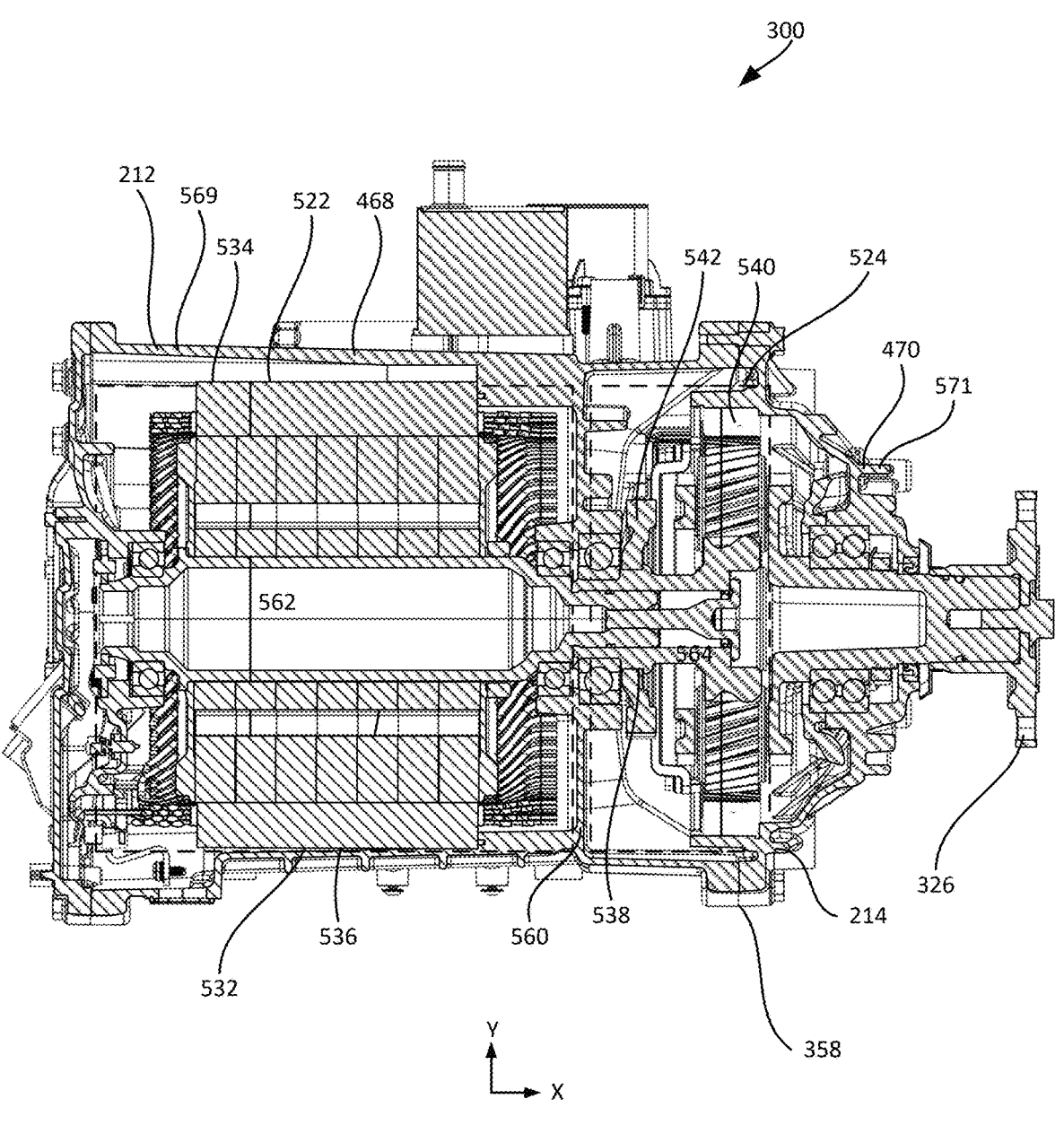
FIG. 5 illustrates a bottom cutaway view of the commercial electric vehicle drive unit, in accordance with certain embodiments.

FIG. 5 illustrates a bottom cutaway view of the commercial electric vehicle drive unit, in accordance with certain embodiments. FIG. 5 illustrates a cutaway view of commercial electric drive unit 300 along plane 5-6 shown in FIG. 4. Commercial electric drive unit 300 shown in FIG. 5 illustrates internal components of commercial electric drive unit 300, including internal components of electric motor module 212 and planetary gearbox module 214.

Figure 6:
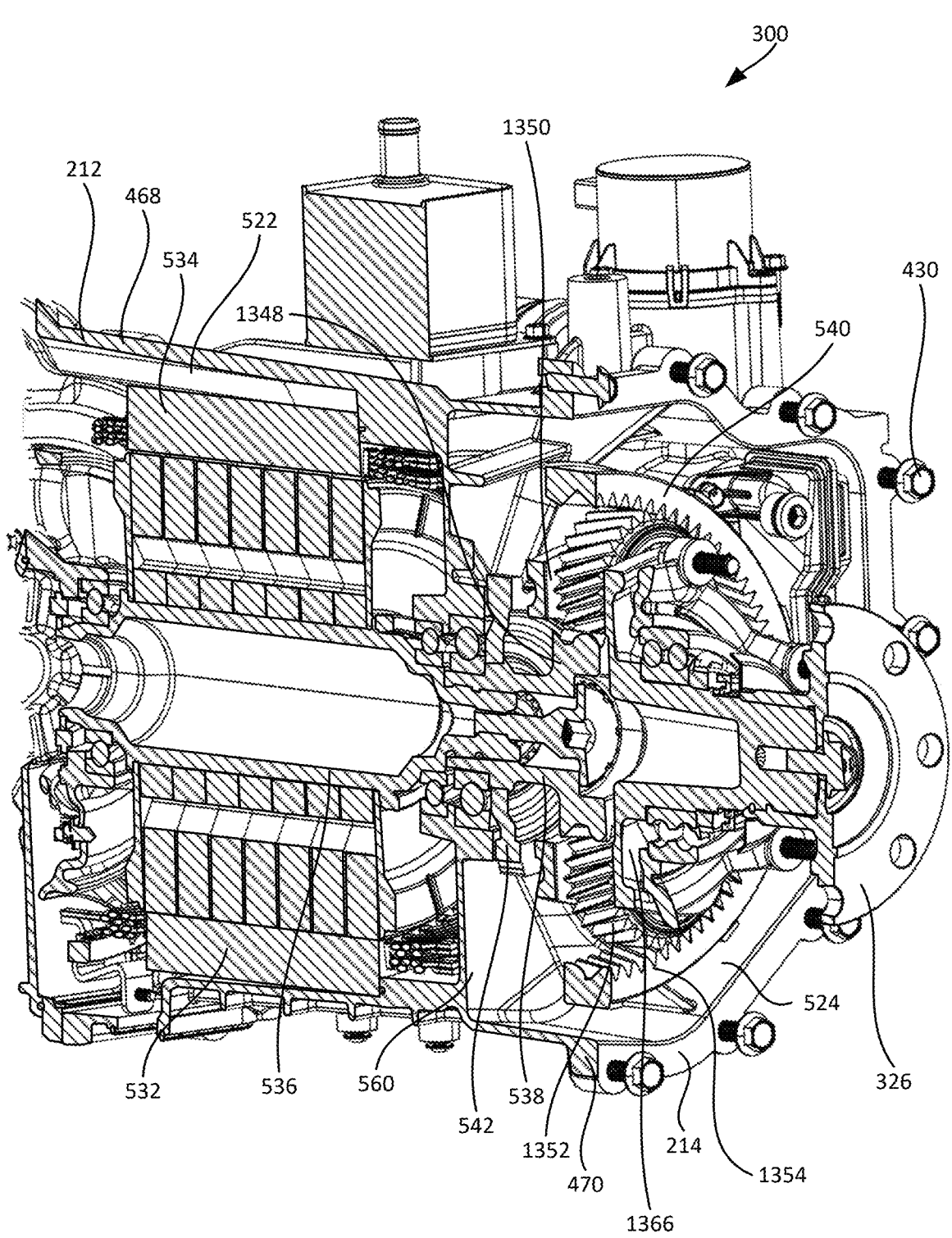
FIG. 6 illustrates an isometric view of a bottom cutaway of the commercial electric vehicle drive unit, in accordance with certain embodiments.

FIG. 6 illustrates an isometric view of a bottom cutaway of the commercial electric vehicle drive unit, in accordance with certain embodiments. FIG. 6 illustrates an isometric cutaway of commercial electric drive unit 300 along plane 5-6 shown in FIG. 4 with second housing walls 571 not shown.

Though drive unit housing 358 may include first housing portion 468 and second housing portion 470, for the purposes of this disclosure, electric motor module 212 may include first housing portion 468 and planetary gearbox module 214 may include second housing portion 470. Thus, drive unit housing 358 may include separate portions that are split between electric motor module 212 and planetary gearbox module 214.

First housing portion 468 may include first housing walls 569 that are formed from any appropriate technique, such as casting, machining, sheetmetal bending, welding, adhesion, mechanical fastening, and/or other such techniques. First housing walls 569 may define first cavity 522 or portions thereof.

Second housing portion 470 may include second housing walls 571, which may also be formed from any appropriate technique as described herein (e.g., casting, machining, sheetmetal bending, welding, adhesion, mechanical fastening, and/or other such techniques). Second housing walls 571 may define second cavity 524 or portions thereof. For the embodiment of commercial electric drive unit 300, second cavity 524 may be at least partially defined by portions of first housing portion 468 (e.g., divider wall 560), but other embodiments may include second cavity 524 that is defined by features of second housing portion 470.

In certain embodiments, while first cavity 522 and second cavity 524 are both cavities within drive unit housing 358, first cavity 522 and second cavity 524 may be separated by divider wall 560. In various embodiments, divider wall 560 may be a wall or a portion of first housing portion 468 and/or second housing portion 470. Divider wall 560 may separate first cavity 522 and second cavity 524 so that divider wall 560 mostly partitions first cavity 522 and second cavity 524 from each other (e.g., covers 80% of more of what would otherwise be a direct opening), but may still include features that allow for first cavity 522 and second cavity 524 to be fluidically connected (e.g., first cavity 522 and second cavity 524 may be connected so that fluids may travel between first cavity 522 and second cavity 524).

Electric motor 532 may be disposed, completely or partially, within first cavity 522. Electric motor 532 may include stator 534 and rotor 536 and may be configured to generate torque when an electric current is provided to electric motor 532. Planetary gearset 540 may output torque generated via motor output shaft 538.

Planetary gearset 540 may be disposed, completely or partially, within second cavity 524. Planetary gearset 540 may receive torque generated by electric motor 532 via motor output shaft 538 and multiply the torque through the planetary gearset. Torque that is multiplied by planetary gearset 540 may then be output via gearset output shaft 326.

Electric motor 532 may be of a first form factor. The first form factor may include first outer diameter 562. Similarly, planetary gearset 540 may be of a second form factor. The second form factor may include second outer diameter 564. In various embodiments, first outer diameter 562 may be the same or greater than second outer diameter 564. An equal or larger first outer diameter 562 than second outer diameter 564 may allow for optimization of packaging of commercial electric drive unit 300 by not increasing the major dimension of commercial electric drive unit 300 in the Y or Z dimension beyond that of electric motor module 212. Such a configuration may allow for packaging of commercial electric drive unit 300 that does not protrude or only minimally protrudes below the frame rails of chassis 102. Other embodiments may include a larger second outer diameter 564 than first outer diameter 562.

In certain embodiments, electric motor module 212 and planetary gearbox module 214 (and, thus, first housing portion 468 and second housing portion 470 as well as electric motor 532 and planetary gearset 540) may be disposed longitudinally in line with each other. That is, electric motor module 212 may be disposed on a first portion of the longitudinal or X axis of vehicle 100 and planetary gearbox module 214 may be disposed on a second portion of the longitudinal or X axis. In certain embodiments, electric motor module 212 may be disposed forward (e.g., towards the front of vehicle 100) of planetary gearbox module 214, or vice versa. Similarly, first housing portion 468 may be disposed longitudinally forward of second housing portion 470, or vice versa, and electric motor 532 may be disposed longitudinally forward of planetary gearset 540, or vice versa.

Torque generated by electric motor 532 may be output by motor output shaft 538 to planetary gearset 540. Planetary gearset 540 gearset may include (as shown in FIG. 6), sun gear 1348, planetary gear 1352 coupled to first carrier 1350 on a first side and second carrier 1366 on a second side, and ring gear 1354. In various embodiments, sun gear 1348 may receive torque output by motor output shaft 538 and the various elements of planetary gearset 540 may then accordingly reduce and multiply the torque and such torque reduced and multiplied by planetary gearset 540 may be output through gearset output shaft 326.

Motor output shaft 538 may input torque to sun gear 1348 of planetary gearset 540. Gearset output shaft 326 may receive torque reduced and multiplied by planetary gearset 540 from second carrier 1366, though other embodiments may receive such torque from ring gear 1354. Gearset output shaft 326 include features, such as threaded holes and/or other features configured to couple to prop shaft 220. In certain embodiments, commercial electric drive unit 300 may further include park lock 542 coupled to motor output shaft 538.

Figure 7:
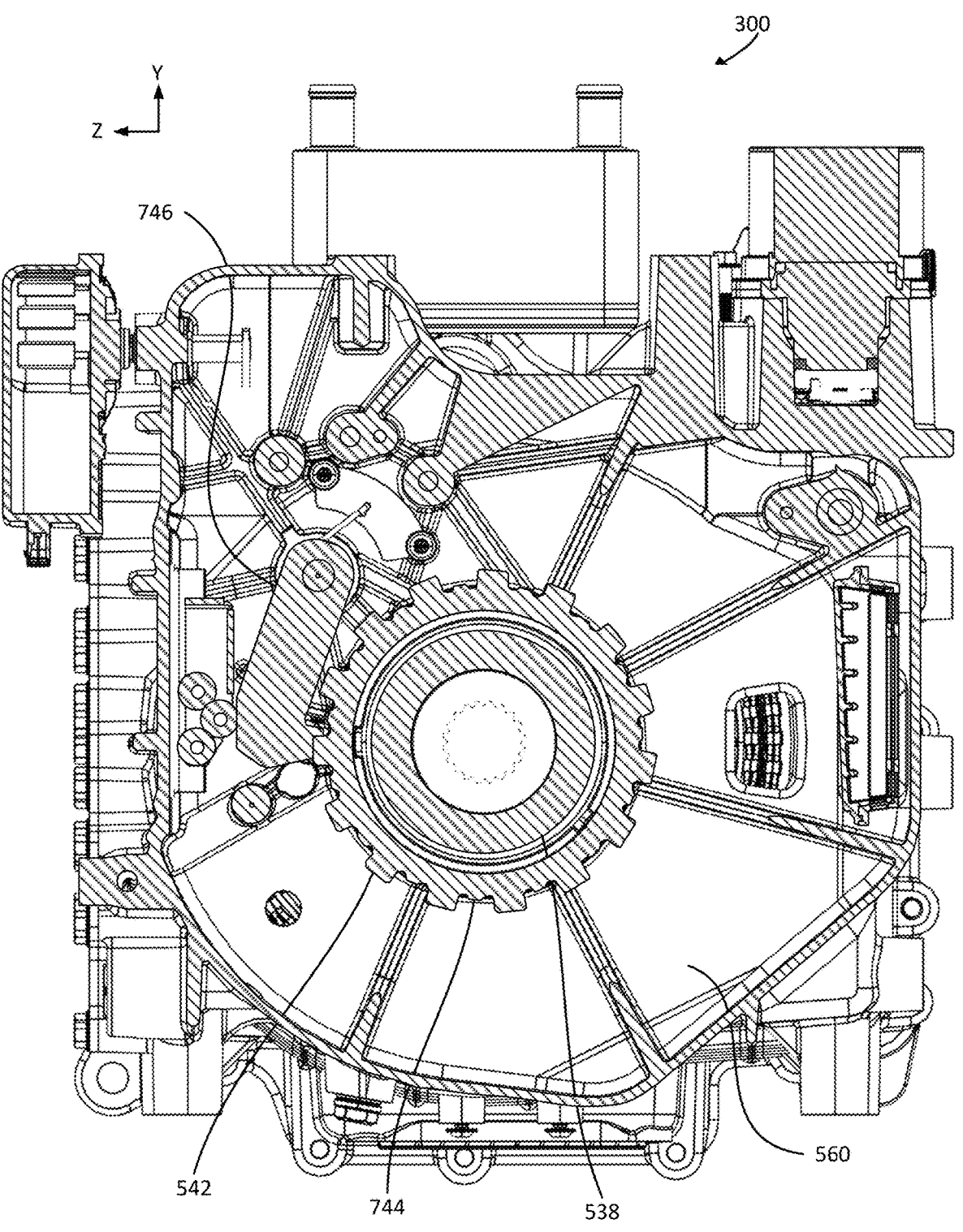
FIG. 7 illustrates a front cutaway view of the commercial electric vehicle drive unit, in accordance with certain embodiments.

FIG. 7 illustrates a front cutaway view of the commercial electric vehicle drive unit, in accordance with certain embodiments. FIG. 7 is a cutaway view of commercial electric drive unit 300 along plane 7 shown in FIG. 4, illustrating park lock 542. Park lock 542 includes park gear 744 and pawl 746. Park gear 744 includes a plurality of detents and park lock 542 may be configured to be engaged through pawl 746 locking into a valley of the detents to prevent movement of motor output shaft 538 and, thus, hold vehicle 100 in place.

Park gear 744 may be coupled to motor output shaft 538. Accordingly, park lock 542, or portions thereof, may be disposed within commercial electric drive unit 300. In various embodiments, park gear 744 may be coupled to motor output shaft 538 through any permanent or semi-permanent technique, such as via mechanical fasteners, welding, adhesives, press fit, and/or other such techniques.

Figure 8:
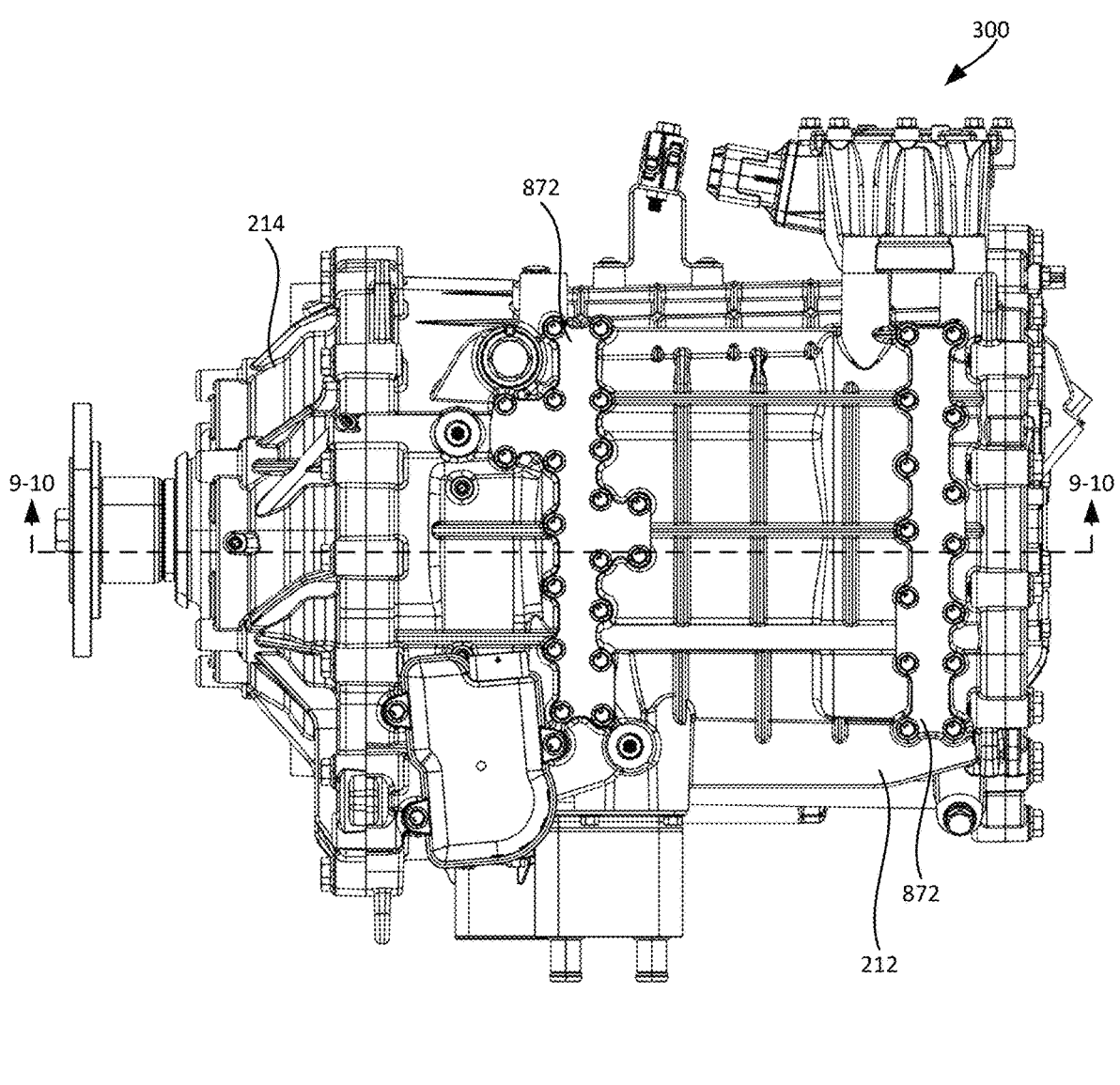
FIG. 8 illustrates a top view of the commercial electric vehicle drive unit, in accordance with certain embodiments.

FIG. 8 illustrates a top view of the commercial electric vehicle drive unit, in accordance with certain embodiments. The top of commercial electric drive unit 300 may include upper sump 872. Upper sump 872 may include a plurality of different upper sump reservoir portions. Upper sump 872 may be disposed within a portion of electric motor module 212 and/or planetary gearbox module 214. FIG. 8 illustrates plane 9-10, which is utilized for cutaway views of FIGS. 9 and 10.

Figure 9:
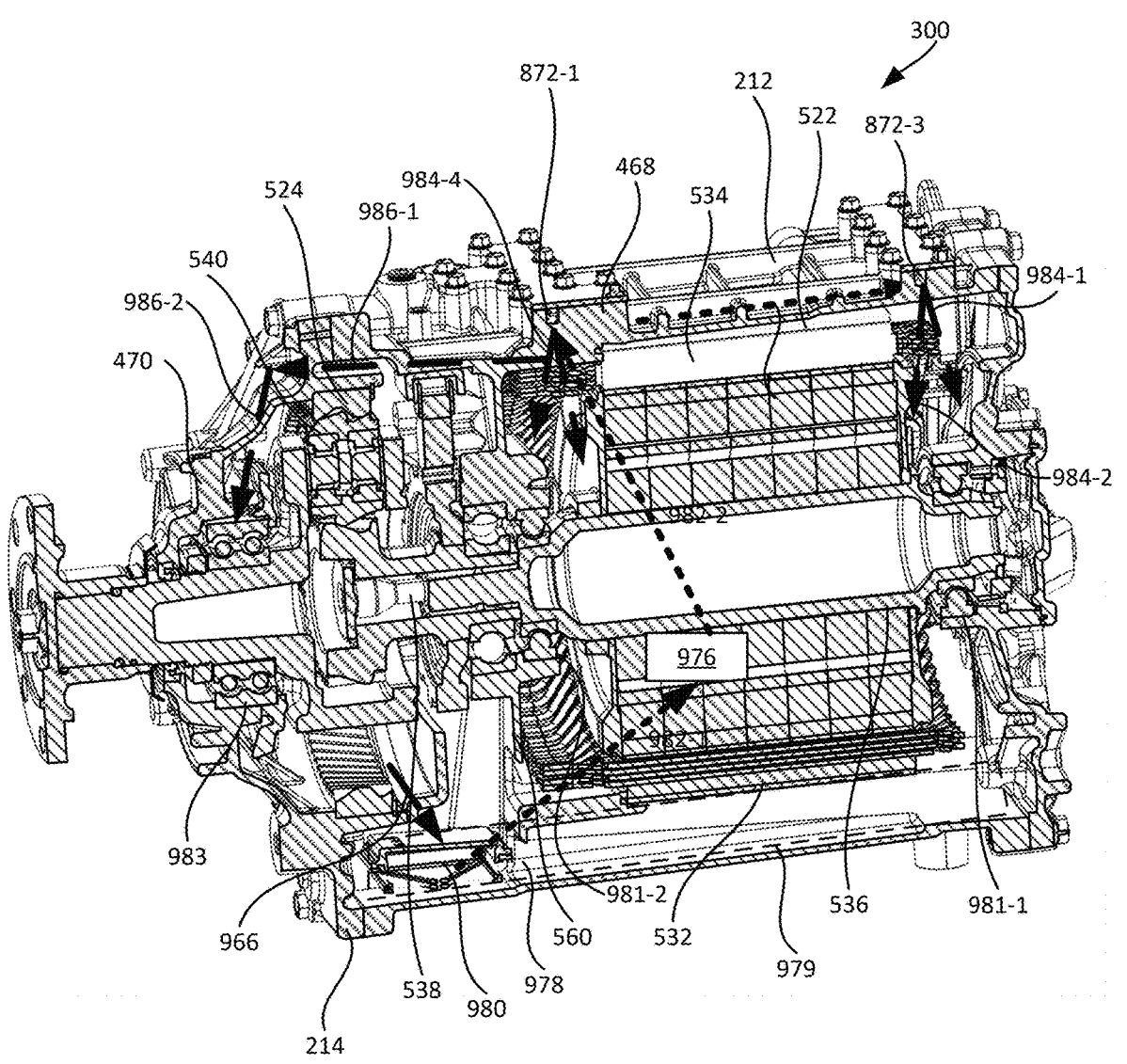
FIG. 9 illustrates an isometric view of a side cutaway of the commercial electric vehicle drive unit, in accordance with certain embodiments.

FIG. 9 illustrates an isometric view of a side cutaway of the commercial electric vehicle drive unit, in accordance with certain embodiments. FIG. 9 illustrates various internal fluid flow paths of commercial electric drive unit 300. The embodiment of commercial electric drive unit 300 illustrated may share a fluid between electric motor module 212 and planetary gearbox module 214 for lubrication, cooling, and/or other such uses. Fluids as described herein may include oil, coolant, and/or other such fluids for cooling, lubrication, and/or other uses.

Upper sump 872 may include a plurality of reservoir portions, such as first reservoir 872-1, cross reservoir 872-2, and second reservoir 872-3. Upper sump 872 may be configured to distribute fluid to first cavity 522 containing electric motor 532 via fluid exits 984, such as side fluid exit 984-1, one or more first fluid exits 984-2, one or more second fluid exits 984-3, and/or bearing fluid exit 984-4. Fluid exits 984 may be configured to distribute fluid from an upper portion of first cavity 522 above electric motor 532.

Fluid flowing from the fluid exits may then flow into or proximate to (e.g., around) motor bearing 981-1 (e.g., fluid from side fluid exit 984-1), into motor bearing 981-2 (e.g., fluid from fluid exit 984-4), and/or into or proximate to electric motor 532 (e.g., from one or more first fluid exits 984-2 and/or one or more second fluid exits 984-3). Variously, side fluid exit 984-1, first fluid exits 984-2, second fluid exits 984-3, and/or fluid exit 984-4 may include one or a plurality of fluid exits, which may include one or more openings. As such, fluid may flow through the openings into first cavity 522. Fluid that flows into elements disposed within first cavity 522 may provide cooling and/or lubrication and may flow downward into lower sump 979.

Upper sump 872 may also be configured to distribute fluid to planetary fluid channel 986, which may be a fluid channel configured to provide fluid from an upper portion of second cavity 524 above planetary gearset 540. Planetary fluid channel 986 may be fluidically connected to upper sump 872 and configured to receive fluid from upper sump 872. Variously, fluid may flow from first planetary fluid channel 986-1 to second planetary fluid channel 986-2 and then into second cavity 524. For example, in certain embodiments, second planetary fluid channel 986-2 may distribute fluid to at least planet carrier bearing 983.

Fluid may flow within second cavity 524 to cool and/or lubricate any item disposed within second cavity 524. Thus, for example, fluid may flow within second cavity 524 to cool and/or lubricate any bearings as well as any portion of planetary gearset 540, including sun gear 1348, first carrier 1350, planetary gears 1352, and/or ring gear 1354. Thus, fluid may flow from planet carrier bearing 983 to portions of planetary gearset 540, and into other features within second cavity 524.

Fluid may then flow into downward portion 966 of second cavity 524 for collection within lower sump 979. Lower sump 979 may be disposed on a lower section of first cavity 522 and/or second cavity 524. In certain embodiments, lower sump 979 may extend across first cavity 522 and second cavity 524 and, thus, include portions of both first cavity 522 and second cavity 524. In certain embodiments, opening 978, which may be an opening within divider wall 560, may allow for lower sump 979 to be disposed below both planetary gearset 540 and electric motor 532.

Filter 980 may be disposed within lower sump 979 and may be configured to remove items suspended within the fluid. Fluid within lower sump 979 may flow through filter 980 and then may be pumped by fluid pump 976 within fluid path 982 (e.g., fluid path 982-1 and fluid path 982-2) into upper sump 872. Fluid pump 976 may be any appropriate pump for pumping fluid. Fluid path 982 may be fluid pathways that are disposed within portions of drive unit housing 358, such as first housing portion 468 and/or second housing portion 470.

Figure 10:
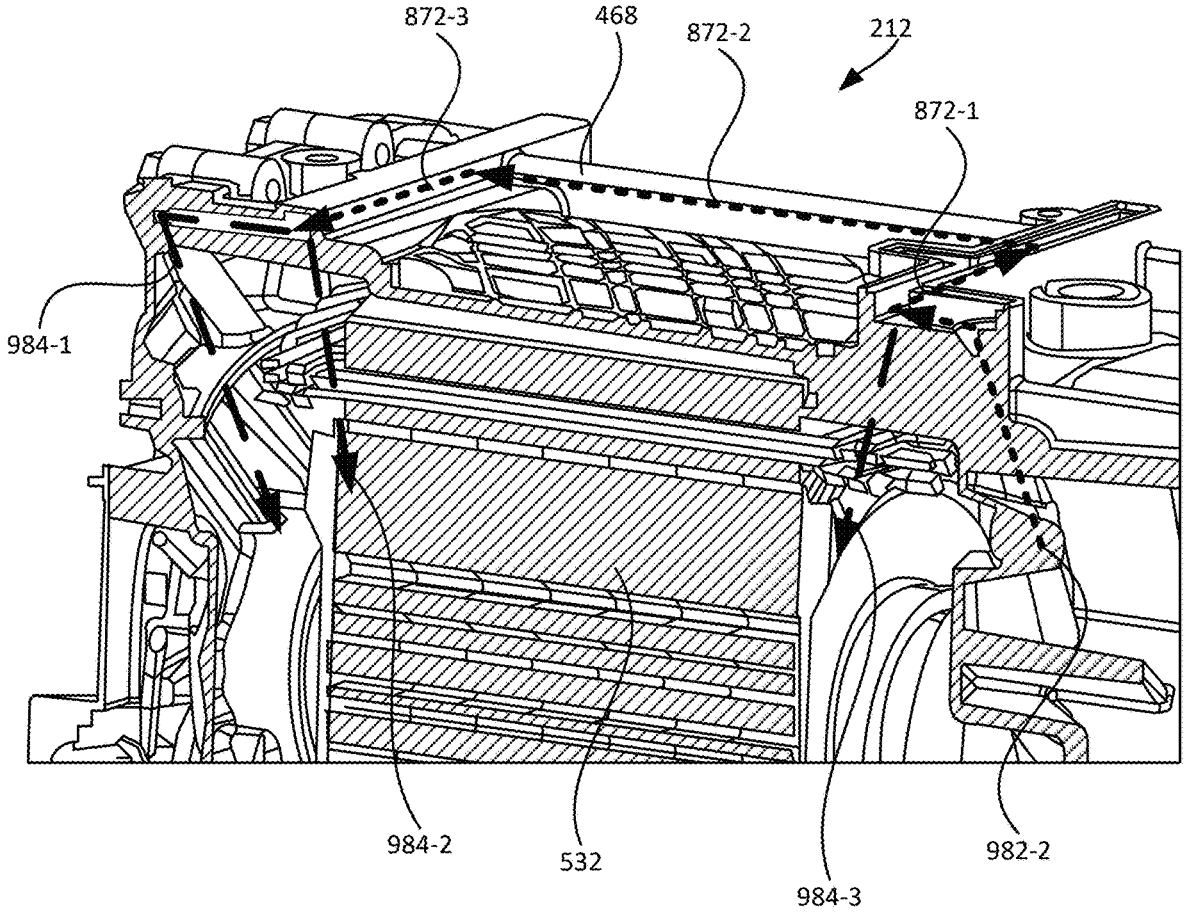
FIG. 10 illustrates an isometric view of a side cutaway the commercial electric vehicle drive unit, illustrating fluid flow within the commercial electric vehicle drive unit, in accordance with certain embodiments.

FIG. 10 illustrates an isometric view of a side cutaway the commercial electric vehicle drive unit, illustrating fluid flow within the commercial electric vehicle drive unit, in accordance with certain embodiments. FIG. 10 illustrates various fluid flow paths of electric motor module 212, such as fluid flow paths that are disposed within first housing portion 468.

Fluid pumped by fluid pump 976 may travel through fluid path 982-2 and reach upper sump 872. Fluid from fluid path 982-2 may first enter first reservoir 872-1. First reservoir 872-1 may include one or more second fluid exits 984-3 for fluid to exit upper sump 872 into first cavity 522. Fluid within first reservoir 872-1 may also flow through cross reservoir 872-2 into second reservoir 872-3. Second reservoir 872-3 may include one or more first fluid exits 984-2 for fluid to exit upper sump 872 into first cavity 522. Fluid may also exit second reservoir 872-3 into side fluid exit 984-1 for cooling and/or lubrication of, for example, motor bearing 981.

Figure 11:
FIG. 11 illustrates a top cutaway view the commercial electric vehicle drive unit, in accordance with certain embodiments.

FIG. 11 illustrates a top cutaway view the commercial electric vehicle drive unit, in accordance with certain embodiments. FIG. 11 may further illustrate features of upper sump 872 and various other fluid channels of commercial electric drive unit 300.

FIG. 11 further illustrates that cross reservoir 872-2 connects first reservoir 872-1 and second reservoir 872-3. One or more of first reservoir 872-1, cross reservoir 872-2, and/or second reservoir 872-3 may be rectangular in profile (e.g., when viewed from above) and/or in cross section, to minimize restrictions. First planetary fluid channel 986-1 may branch off of first reservoir 872-1 and allow for fluid to flow from first reservoir 872-1 into second planetary fluid channel 986-2 and, thus, into second cavity 524 via second planetary fluid channel 986-2.

In various embodiments, first planetary fluid channel 986-1 may be a channel within first housing portion 468 and second planetary fluid channel 986-2 may be a channel within second housing portion 470. Thus, first planetary fluid channel 986-1 may include opening 1190 within first housing portion 468 and second planetary fluid channel 986-2 may include opening 1192 within second housing portion 470. Opening 1190 may be configured to at least partially align with opening 1192 when first housing portion 468 is coupled to second housing portion 470, to allow for fluid to flow from first planetary fluid channel 986-1 to second planetary fluid channel 986-2. Such a configuration may allow for a fluid pump of electric motor module 212 to provide fluid flow to planetary gearbox module 214.

First reservoir 872-1 may include one or more first fluid exits 984-2 disposed on a base or sidewall of the channel of first reservoir 872-1. One or more first fluid exits 984-2 may include one or a plurality of openings configured to allow flow of fluid through fluid exits 984-2. For example, in the embodiment of commercial electric drive unit 300, one or more first fluid exits 984-2 may include a plurality of openings disposed along intervals of first reservoir 872-1.

Second reservoir 872-3 may, additionally or alternatively, include one or more second fluid exits 984-3 disposed on a base or sidewall of the channel of second reservoir 872-3. One or more second fluid exits 984-3 may include one or a plurality of openings configured to allow flow of fluid through fluid exits 984-3. For example, in the embodiment of commercial electric drive unit 300, one or more first fluid exits 984-3 may include a plurality of openings disposed along intervals of first reservoir 872-3.

Figure 12:
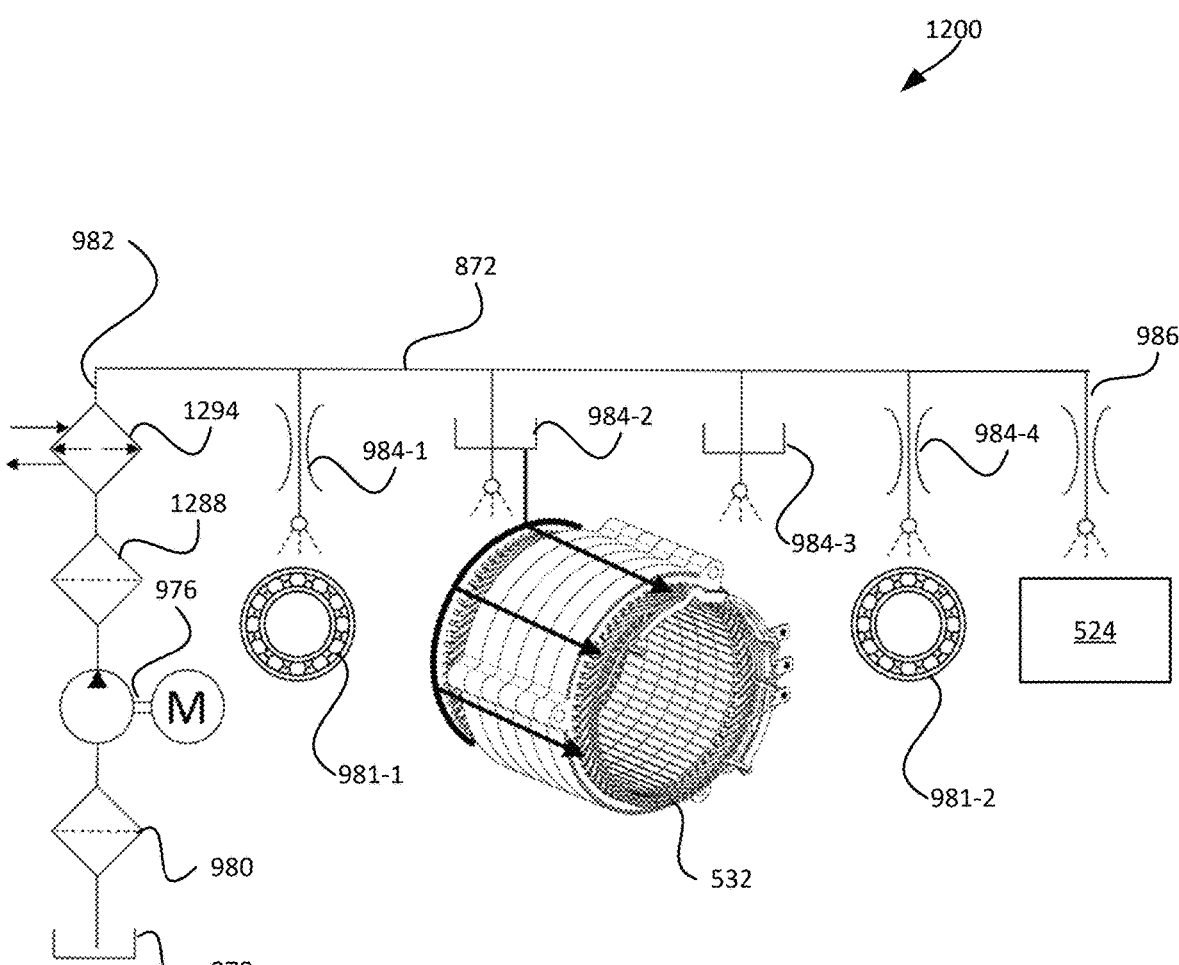
FIG. 12 is a fluid diagram of a drive unit cooling system, in accordance with certain embodiments.

FIG. 12 is a fluid diagram of a drive unit cooling system, in accordance with certain embodiments. FIG. 12 illustrates system 1200, which includes lower sump 979, filter 980, fluid pump 976, filter 1288, heat exchanger 1294, fluid path 982, upper sump 872, fluid exits 984, motor bearings 981, electric motor 532, and second cavity 524. Motor bearings 981 may be bearings configured to allow for operation of electric motor 532 (e.g., for the spinning of various components of electric motor 532).

System 1200 may illustrate a system for cooling or lubrication of various components of commercial electric drive unit 300. Such a system may share a fluid or fluids within commercial electric drive unit 300. Thus, electric motor 532 and planetary gearset 540 may share a fluid or fluids, in accordance with the description of system 1200.

Fluid may collect within lower sump 979 (e.g., may flow downward from first cavity 522 or components disposed thereof, such as motor bearing 981 or electric motor 532, or may flow downward from second cavity 524 of components disposed thereof, such as planetary gearset 540 or planet carrier bearing 983). Fluid pump 976 may pump the fluid collected within lower sump 979 through filter 980, filter 1288, heat exchanger 1294, and/or fluid path 982 to upper sump 872. It is appreciated that, though the disclosure herein may describe components in the singular or plural, embodiments may utilize any number of such components, whether singularly or in a plurality.

Filter 980 and/or filter 1288 may be configured to remove impurities from the fluid. In various embodiments, such filters may include bypasses to allow for bypassing the flow restriction created by the filters based on conditions. As the fluid may be utilized for cooling, fluid may travel through and be cooled by heat exchanger 1294. Thus, heat exchanger 1294 may be a heat exchanger or radiator that allows for the fluid to reject heat to air, water, or coolant mediums.

At least a portion of upper sump 872 may be disposed above first cavity 522, second cavity 524, and/or components disposed within first cavity 522 and/or second cavity 524. Upper sump 872 may be configured to distribute fluid to various components of commercial electric drive unit 300, such as motor bearing 981, electric motor 532, planetary gearset 540, and/or planet carrier bearing 983.

Thus, for example, upper sump 872 may distribute the fluid to motor bearing 981-1 via side fluid exit 984-1, to motor bearing 981-2 via fluid exit 984-4, to electric motor 532 via one or more first fluid exits 984-2 and/or one or more second fluid exits 984-3. Upper sump 872 may also distribute fluid to planetary fluid channel 986. Fluid may then flow through planetary fluid channel 986 into second cavity 524 for cooling and lubrication of components disposed within second cavity 524 (e.g., planetary gearset 540 or planet carrier bearing 983).

Fluid exits as described herein may include one or more of a nozzle, sprayer, pump, fluid collector, and/or other device that may be configured to provide a flow of fluid from a plenum (e.g., upper sump 872). In certain embodiments, fluid exits may include a thermostat, restrictor, and/or other device that may vary the flow of fluid through the fluid exits depending on conditions (e.g., fluid temperature, pressure, and/or other such conditions). Such devices may be passive or actively controlled.

Variously, one or more first fluid exits 984-2 and/or one or more second fluid exits 984-3 may be configured to provide fluid to components of electric motor 532 (e.g., components of stator 534 and/or rotor 536 such as windings and/or other components).

The various fluid exits described herein may be configured to regulate the flow of fluid into first cavity 522 or second cavity 524. Such fluid exits may be any configuration as described herein and may, alternatively or additionally, provide for a waterfall or jet of fluid to the desired portion of commercial electric drive unit 300. In certain embodiments, one or more such fluid exits may include thermostats such as wax valves to control the flow of fluid within commercial electric drive unit 300.

Upper sump 872 may be disposed above lower sump 979. Variously, upper sump 872 may be disposed above first cavity 522 and/or second cavity 524 while lower sump 979 may be disposed below or level with a portion of first cavity 522 and/or second cavity 524. During normal operation of vehicle 100, upper sump 872 may be disposed above first cavity 522 and/or second cavity 524 in a manner where the fluid flows downward from the upper sump 872 to first cavity 522 and/or second cavity 524 via gravity. Upper sump 872 may also be configured to provide fluid to planetary fluid channel 986, which may be a channel that is at least partially disposed within second housing portion 470. As such, system 1200 may be configured such that upper sump 872 may fluid to a flow channel of a housing portion different from the housing portion that upper sump 872 is disposed within.

The configuration of system 1200 may be advantageous for a variety of reasons. For example, shared fluids for electric motor module 212 and planetary gearbox module 214 may provide for sufficient cooling for both electric motor 532 and planetary gearset 540. As the fluid is shared, the temperature between electric motor 532 and planetary gearset 540 may be fairly consistent with each other and, thus, may minimize the time needed for warm up of electric motor module 212 and planetary gearbox module 214 and, thus, provide superior reliability.

Furthermore, the configuration of system 1200 allows for a single pump to provide cooling and lubrication fluid to a plurality of different modules (e.g., electric motor module 212 and planetary gearbox module 214). Thus, for example, fluid pump 976 may provide fluid for both electric motor 532 and planetary gearset 540.

Typical systems may provide for an electric motor and a separate reduction. Disposing electric motor 532 and planetary gearset 540 longitudinally in line within the same housing allows for a smaller form factor in certain dimensions (e.g., along the Y and Z axis, where typical vehicles are limited in space), eliminates external connections (e.g., shafts) between the electric motor and the reduction, and allows for shared fluids while maintaining the flexibility of separate modules for the electric motor and planetary gearset so that, for example, the ratio of planetary gearset 540 may be varied according to need (e.g., by unbolting second housing portion 470 and swapping out planetary gearbox module 214 for another such module).

Planetary Gearbox Examples

Figure 13:
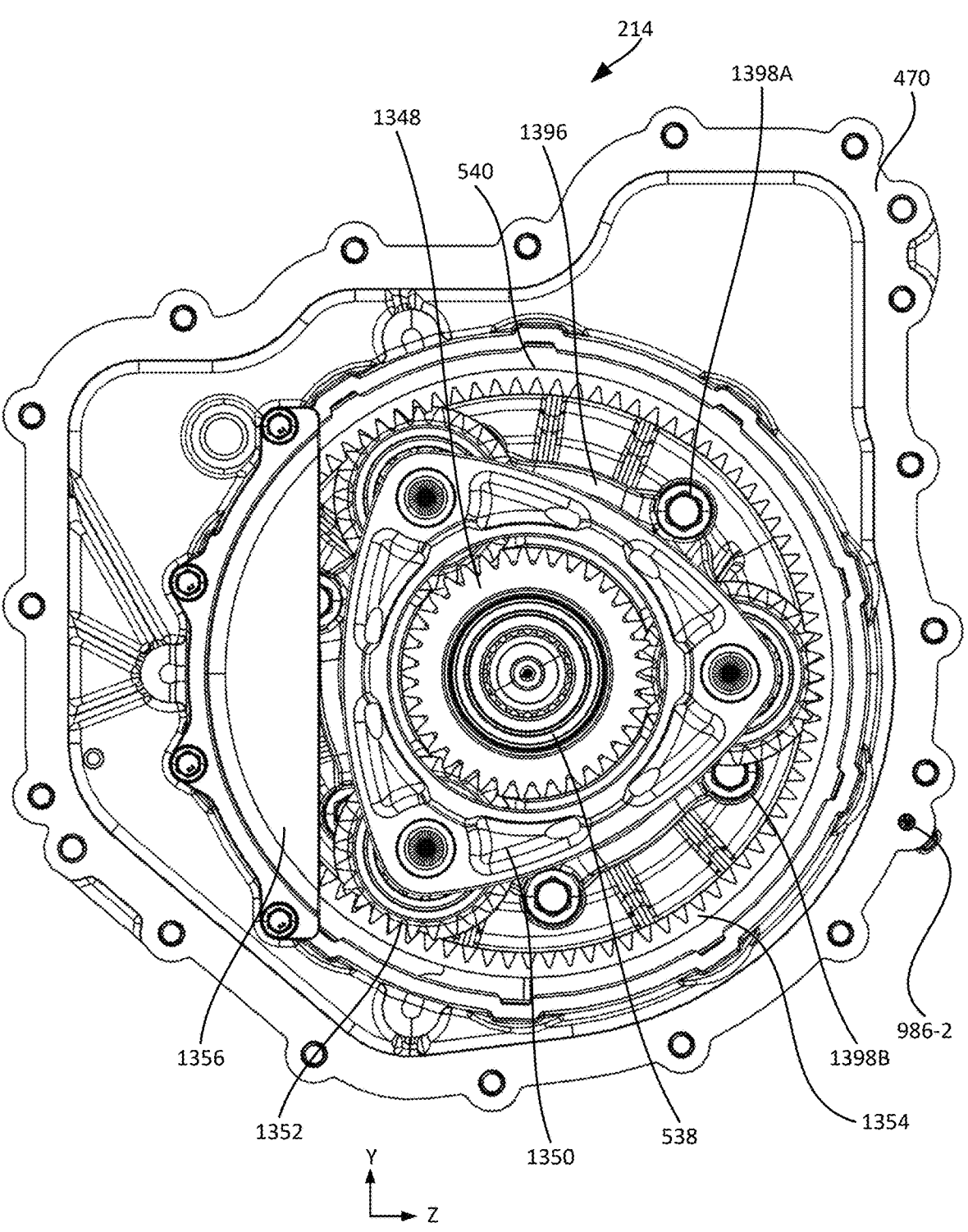
FIG. 13 is a rear view of a planetary gearbox, in accordance with certain embodiments.

FIG. 13 is a rear view of a planetary gearbox, in accordance with certain embodiments. FIG. 13 illustrates features of planetary gearbox module 214. Planetary gearbox module 214 may include sun gear 1348, first carrier 1350, planetary gear 1352, ring gear 1354, bearing carrier 1396, and fluid collector 1356. Such elements may coupled to and/or disposed within second housing portion 470.

Motor output shaft 538 may, in various embodiments, by coupled to sun gear 1348 and, thus, configured to transit torque to sun gear 1348. A plurality of planetary gears 1352 may be meshed with sun gear 1348. The plurality of planetary gears 1352 may be coupled to first carrier 1350. Carriers of planetary gear 1352 may control the distance between the various planetary gears 1352. Planetary gears 1352 may mesh with ring gear 1354. Based on the size and teeth count of the various gears, planetary gearset 540 may provide for torque multiplication.

Fluid collector 1356 may be disposed around a lower portion of planetary gearset 540 (e.g., lower than half the diameter of ring gear 1354). Fluid collector 1356 may be configured to allow oil to pool on a lower portion of planetary gearset 540. The pooled oil may then be picked up by the gears of planetary gearset 540 and provide cooling and/or lubrication to the gears. Second housing portion 470 may further include second planetary fluid channel 986-2, which may be configured to interface with first planetary fluid channel 986-1 of electric motor module 212 to provide fluids to planetary gearbox module 214.

Figure 14:
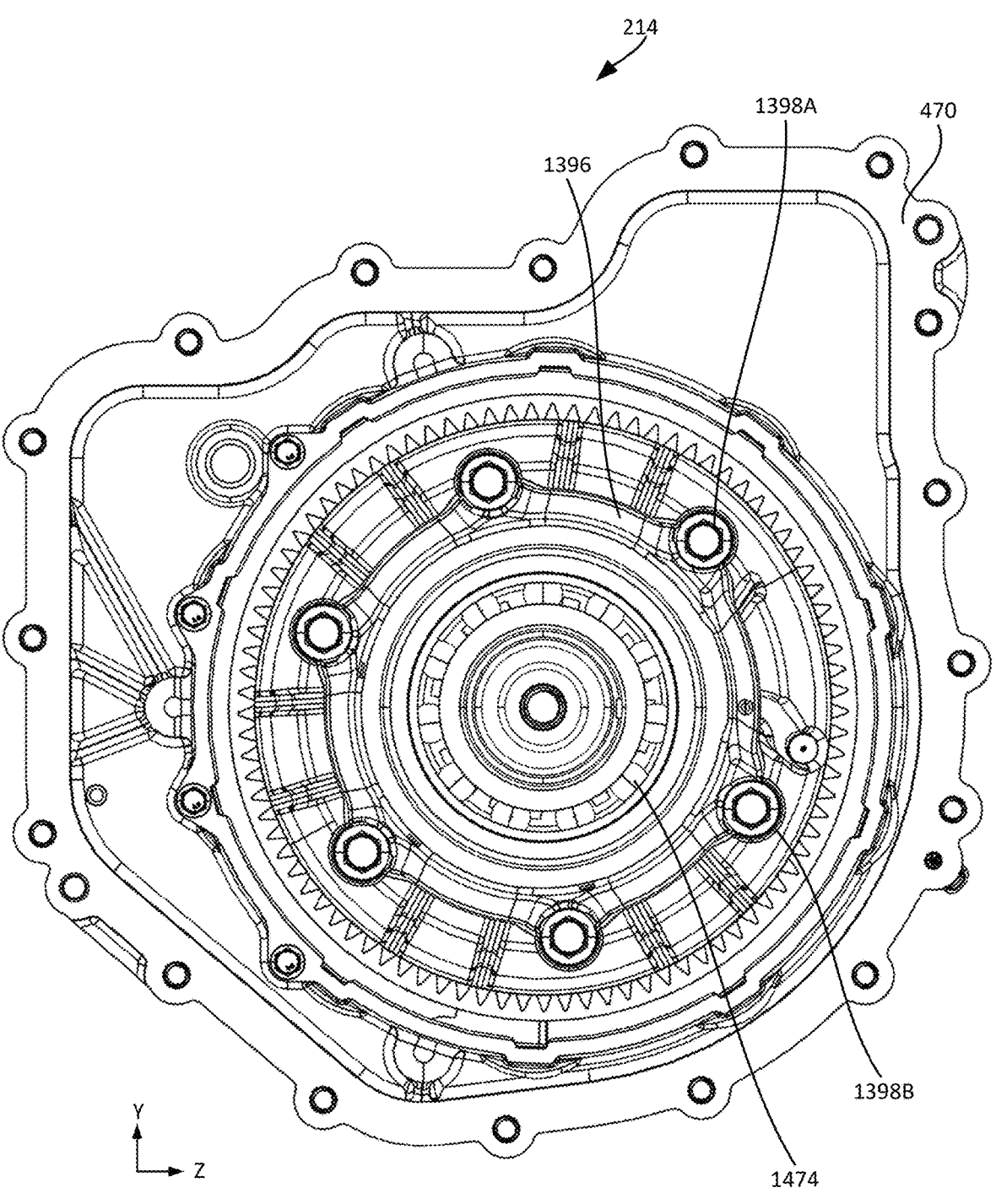
FIG. 14 is a rear view of certain portions of the planetary gearbox, in accordance with certain embodiments.

Bearing carrier 1396 may be configured to provide fluid and hold a bearing of planetary gearbox module 214. Bearing carrier 1396 may be disposed between the planetary gearset 540 and the planet carrier bearing 983 and configured to retain the planet carrier bearing 983 within an opening of second housing portion 470. Bearing carrier 1396 may be coupled to second housing portion 470 via a plurality of strategically positioned plurality of carrier bolts 1398, including carrier bolts 1398A and 1398B. FIG. 14 may further illustrate features of bearing carrier 1396.

FIG. 14 is a rear view of certain portions of the planetary gearbox, in accordance with certain embodiments. FIG. 14 illustrates planetary gearbox module 214 with motor output shaft 538, sun gear 1348, first carrier 1350, and planetary gear 1352 hidden. As shown in FIG. 14, bearing carrier 1396 may be disposed around an outer portion of bearing 1474. Bearing carrier 1396 may include a plurality of bolt holes configured to receive plurality of carrier bolts 1398. In certain embodiments, the positioning may be configured to that at least one carrier bolt 1398 is accessible to a tool for tightening plurality of carrier bolts 1398 to second housing portion 470.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A commercial electric drive unit comprising:
a drive unit housing, comprising:
    a first housing portion, comprising a divider wall and containing a first cavity; and
    a second housing portion, mechanically connected to the first housing portion, disposed longitudinally in line with the first housing portion, and at least partially containing a second cavity, wherein the divider wall separates the first cavity and the second cavity;
an electric motor, disposed within the first cavity and comprising:
    a stator; and
    a rotor;
a motor output shaft, coupled to the rotor;
a planetary gearset, disposed longitudinally in line of the electric motor within the drive unit housing, the planetary gearset comprising:
    a sun gear, connected to the motor output shaft;
    a plurality of planet gears disposed around the sun gear; and
    a ring gear disposed around the plurality of planet gears; and
a gearset output shaft, coupled to the planetary gearset, wherein the commercial electric drive unit is configured to:
    generate electric motor torque with the electric motor;
    transmit electric motor torque with the motor output shaft to the sun gear of the planetary gearset;
    multiply the electric motor torque from the motor output shaft with the planetary gearset;
    provide the multiplied electric motor torque to the gearset output shaft; and
    output the multiplied electric motor torque with the gearset output shaft.

2. The commercial electric drive unit of claim 1, wherein the first cavity and the second cavity are fluidically connected and wherein the electric motor and the planetary gearset are configured to share a fluid.

3. The commercial electric drive unit of claim 2, wherein the divider wall comprises an opening that defines at least a portion of a lower sump to fluidically connect the first cavity and the second cavity.

4. The commercial electric drive unit of claim 3, wherein the first housing portion further comprises an upper sump disposed on a top portion of the first housing portion above the first cavity, and wherein the commercial electric drive unit further comprises:
a fluid pump configured to pump the fluid from the lower sump to the upper sump.

5. The commercial electric drive unit of claim 4, wherein:
the first housing portion further comprises a first planetary fluid channel, wherein the upper sump is fluidically connected to the first planetary fluid channel to allow the fluid to flow from the upper sump into the first planetary fluid channel; and
the second housing portion further comprises a second planetary fluid channel configured to provide the fluid to the second cavity, wherein the first planetary fluid channel is fluidically connected to the second planetary fluid channel to allow the fluid to flow from the first planetary fluid channel into the second planetary fluid channel.

6. The commercial electric drive unit of claim 5, wherein planetary gearset further comprises a planet carrier bearing, and wherein the second planetary fluid channel is configured to distribute the fluid to the planet carrier bearing.

7. The commercial electric drive unit of claim 6, further comprising:
a fluid collector, coupled to the second housing portion at a lower portion of the ring gear.

8. The commercial electric drive unit of claim 6, further comprising:
a bearing carrier, disposed between the planetary gearset and the planet carrier bearing and configured to retain the planet carrier bearing.

9. The commercial electric drive unit of claim 8, wherein the bearing carrier is coupled to the second housing portion by a plurality of carrier bolts.

10. The commercial electric drive unit of claim 5, wherein the upper sump comprises:
a first reservoir comprising one or more first fluid exits configured to distribute fluid to one or more of the stator or the rotor; and
a second reservoir comprising one or more second fluid exits configured to distribute the fluid to one or more of the stator or the rotor.

11. The commercial electric drive unit of claim 10, wherein the upper sump further comprises a cross reservoir, wherein the first reservoir and the second reservoir are fluidically connected by the cross reservoir.

12. The commercial electric drive unit of claim 11, wherein the cross reservoir is rectangular in profile.

13. The commercial electric drive unit of claim 10, wherein:
the electric motor further comprises a motor bearing; and
the first housing portion further comprises a side fluid exit configured to distribute the fluid to the motor bearing, wherein the second reservoir is fluidically connected to the side fluid exit to allow the fluid to flow from the second reservoir into the side fluid exit.

14. The commercial electric drive unit of claim 1, further comprising a park lock, the park lock comprising a park gear coupled to the motor output shaft.

15. The commercial electric drive unit of claim 14, wherein the park gear is welded to the motor output shaft.

16. The commercial electric drive unit of claim 1, wherein a first outer diameter of the stator is greater than a second outer diameter of the ring gear.

17. The commercial electric drive unit of claim 1, wherein the first housing portion and the second housing portion are mechanically connected by a plurality of housing bolts.

18. The commercial electric drive unit of claim 1, wherein the gearset output shaft is disposed longitudinally in line of the planetary gearset and is at least partially disposed outside the drive unit housing.

19. A commercial electric vehicle comprising the commercial electric drive unit of claim 1, wherein the commercial electric vehicle further comprises:
a ladder frame, coupled to the commercial electric drive unit and comprising:
    a first frame rail; and
    a second frame rail; and
a prop shaft, coupled to the gearset output shaft.

20. The commercial electric vehicle of claim 19, wherein the commercial electric drive unit is disposed between the first frame rail and the second frame rail and is disposed to not protrude below the first frame rail and/or the second frame rail.

\* \* \* \* \*